W. LU V. LOOP.
NUT LOCK.
APPLICATION FILED MAY 3, 1910.
995,881.
Patented June 20, 1911.
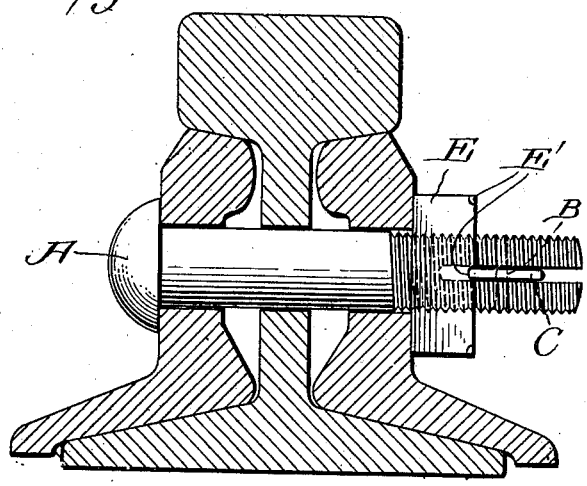
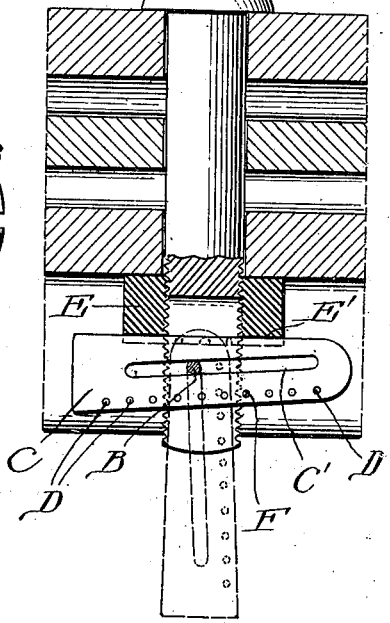
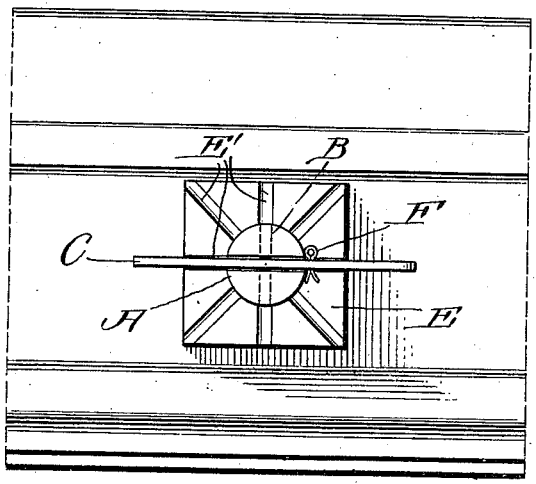
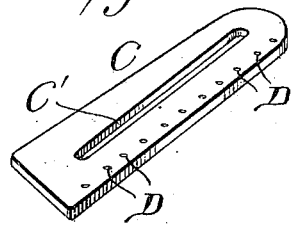
Witnesses
Oliver N. Holmes
Oen Albright
Inventor
W. Lu Vern Loop
By Thos. E. Brock
Attorney

UNITED STATES PATENT OFFICE.

WARREN LU VERN LOOP, OF ELDRED, PENNSYLVANIA, ASSIGNOR OF ONE-THIRD TO ANDREW LONG AND ONE-THIRD TO ORVEL BELL, OF ELDRED, PENNSYLVANIA.

NUT-LOCK.

995,881.          Specification of Letters Patent.     Patented June 20, 1911.

Application filed May 3, 1910. Serial No. 559,141.

*To all whom it may concern:*

Be it known that I, WARREN LU VERN LOOP, a citizen of the United States, residing at Eldred, in the county of McKean and State of Pennsylvania, have invented a new and useful Improvement in Nut-Locks, of which the following is a specification.

This invention relates to certain new and useful improvements in nut locks especially adapted to be used on bolts for fastening rail joints, the object being to provide a nut lock which is so constructed that the nut will be securely locked without any danger of the same working loose.

Another object of my invention is to provide a nut lock in which the locking pin is so mounted within the bolt that the same will be forced tightly against the outer face of the nut so as to prevent the same from turning.

A still further object of my invention is to provide means for locking the pin into engagement with the nut, so that all danger of the same working loose is prevented.

With these objects in view the invention consists in the novel features of construction, combination and arrangement of parts, hereinafter fully described and pointed out in the claims.

In the drawing forming a part of this specification: Figure 1 is a transverse section through a rail joint showing the application of my improved nut lock. Fig. 2 is a horizontal section through the same. Fig. 3 is a side elevation. Fig. 4 is a perspective view of the locking pin.

In carrying out my improved invention, I employ a bolt A having its threaded end bifurcated, and provided with a transverse rivet B, on which is pivotally and slidably mounted a locking pin C which fits in the bifurcation of the bolt, and is provided with an oblique slot C′, and a series of perforations D, along one edge for the purpose hereinafter fully described.

Mounted on the bolt is a nut E having its outer face grooved as shown at E′, in which the edge of the locking pin C is adapted to fit, after the nut has been screwed tightly against the member to be secured and it will be seen by giving the pin a slight tap with the hammer, the oblique slot will force the same into the groove in such a manner that it will be impossible for the nut to turn in any way.

For preventing the pin from working out of the grooves of the nut, I insert a staple or key F in one of the openings of the pin adjacent the bolt, and it will be seen by this construction it will be impossible for the pin to be detached until the key has been removed. By providing the face of the nut with radial grooves to receive the edge of the flat pin, the nut can be locked in several positions, so that the same will be held tightly against the member to be secured. When it is desired to remove the nut from the bolt, the key is removed and by swinging the pin longitudinally of the bolt, the nut can be readily slipped off or on, and it will be seen that by providing the pin with an obliquely arranged slot, the edge will be forced into engagement with the nut when the same is in a different position on the bolt.

Having thus fully described my invention, what I claim as new and desire to secure by Letters Patent is:—

1. The combination with a bolt having a bifurcated end, of a locking pin pivotally and slidably mounted in the bifurcation of said bolt, and a nut having a grooved outer face adapted to receive the edge of said pin.

2. The combination with a bolt having a bifurcated end, of a nut working on said bolt provided with radial grooves in its outer face, a pin pivotally and slidably mounted in the bifurcation of said bolt provided with a series of openings, and a key adapted to fit in one of said openings for locking said pin in the grooves of said nut.

3. The combination with a bolt having a bifurcated end, of a nut working on said bolt provided with a grooved outer face, a pin extending transversely through the end of said bolt, a locking pin having an oblique slot mounted on said pin in said bifurcation adapted to fit within the groove of the nut, and means for locking said pin in engagement with said nut.

4. A nut lock comprising a threaded bolt having a bifurcated end, a rivet extending transversely through said bolt adjacent its end, a nut working on said bolt provided with radial grooves in its outer face, a flat pin provided with an oblique slot mounted on said rivet within said bifurcation, said pin being provided with a series of openings, and a key adapted to fit within one of said openings for locking the edge of said pin in one of the grooves of said nut.

WARREN LU VERN LOOP.

Witnesses:
F. F. LOOP.
GEO. E. SMITH.

Copies of this patent may be obtained for five cents each, by addressing the "Commissioner of Patents, Washington, D. C."